(12) United States Patent
Wolrich et al.

(10) Patent No.: US 9,912,481 B2
(45) Date of Patent: Mar. 6, 2018

(54) METHOD AND APPARATUS FOR EFFICIENTLY EXECUTING HASH OPERATIONS

(71) Applicant: INTEL CORPORATION, Santa Clara, CA (US)

(72) Inventors: Gilbert M. Wolrich, Framingham, MA (US); Vinodh Gopal, Westborough, MA (US); Kirk S. Yap, Framingham, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 14/228,056

(22) Filed: Mar. 27, 2014

(65) Prior Publication Data

US 2015/0280917 A1 Oct. 1, 2015

(51) Int. Cl.
*H04L 9/32* (2006.01)
*G06F 12/08* (2016.01)
(Continued)

(52) U.S. Cl.
CPC ........ *H04L 9/3239* (2013.01); *G06F 12/0811* (2013.01); *H04L 9/0643* (2013.01); *G06F 2212/283* (2013.01); *H04L 2209/125* (2013.01)

(58) Field of Classification Search
CPC ................. H04L 9/3239; H04L 9/0643; H04L 2209/125; G06F 12/081; G06F 2212/283
See application file for complete search history.

(56) References Cited

U.S. PATENT DOCUMENTS

| 4,250,483 A | 2/1981 | Rubner |
| 5,339,398 A | 8/1994 | Shah et al. |

(Continued)

FOREIGN PATENT DOCUMENTS

| CN | 103457719 A | 12/2013 |
| CN | 103477341 A | 12/2013 |

(Continued)

OTHER PUBLICATIONS

Jim Guilford et al. "Fast SHA-256 Implementations on Intel Architecture Processors" May 2012 (18 pages).*

(Continued)

*Primary Examiner* — Joseph P Hirl
*Assistant Examiner* — Thomas Gyorfi
(74) *Attorney, Agent, or Firm* — Nicholson, DeVos, Webster

(57) ABSTRACT

An apparatus and method are described for executing hash functions on a processor. For example, one embodiment of a processor comprises: a register set including a first storage location and a second storage location in which state variables for a hash function are to be stored; an execution unit to execute the hash function and to initially designate the first storage location as storing a first set of state values used for computing rounds of the hash function, and to initially designate a second storage location as storing a second set of state values also used for computing the rounds of the hash function; and the execution unit to execute a plurality of rounds of the hash function using the first and second sets of state data, wherein executing includes swapping the designations of the first storage location and second storage location such that the first storage location is designated to store the first set of state values for a first set of rounds and the second set of state values for a second set of rounds, and wherein the second storage location is designated to store (Continued)

the second set of state values for the first set of rounds and the first set of state values for the second set of rounds.

25 Claims, 11 Drawing Sheets

(51) Int. Cl.
*G06F 12/0811* (2016.01)
*H04L 9/06* (2006.01)

(56) References Cited

U.S. PATENT DOCUMENTS

| | | |
|---|---|---|
| 5,608,801 A | 3/1997 | Aiello et al. |
| 5,649,179 A | 7/1997 | Steenstra et al. |
| 5,920,900 A | 7/1999 | Poole et al. |
| 5,960,434 A | 9/1999 | Schimmel |
| 6,067,547 A | 5/2000 | Douceur |
| RE37,178 E | 5/2001 | Kingdon |
| 6,226,710 B1 | 5/2001 | Melchior |
| 6,260,055 B1 | 7/2001 | Sugeno et al. |
| 6,307,955 B1 | 10/2001 | Zank et al. |
| 6,360,218 B1 | 3/2002 | Zander et al. |
| 6,470,329 B1 | 10/2002 | Livschitz |
| 6,539,373 B1 | 3/2003 | Guha |
| 6,578,131 B1 | 6/2003 | Larson et al. |
| 6,594,665 B1 | 7/2003 | Sowa et al. |
| 6,631,419 B1 | 10/2003 | Greene |
| 6,952,770 B1 | 10/2005 | Mittal et al. |
| 7,047,394 B1 | 5/2006 | Van Dyke et al. |
| 7,073,059 B2 | 7/2006 | Worely, Jr. et al. |
| 7,165,135 B1 | 1/2007 | Christie et al. |
| 7,240,203 B2 | 7/2007 | Kessler et al. |
| 7,373,514 B2 | 5/2008 | Krueger et al. |
| 7,599,489 B1 | 10/2009 | Spracklen |
| 7,684,563 B1 | 3/2010 | Olson et al. |
| 7,725,624 B2 | 5/2010 | Feghali et al. |
| 7,743,235 B2 | 6/2010 | Wolrich et al. |
| 8,020,142 B2 | 9/2011 | Wolrich et al. |
| 8,073,892 B2 | 12/2011 | Feghali et al. |
| 8,255,703 B2 | 8/2012 | Crispin et al. |
| 8,316,191 B2 | 11/2012 | Wheeler et al. |
| 8,504,802 B2 | 8/2013 | Valentine et al. |
| 8,634,550 B2 | 1/2014 | Gueron et al. |
| 9,658,854 B2 | 5/2017 | Wolrich et al. |
| 2002/0032551 A1 | 3/2002 | Zakiya |
| 2002/0184498 A1 | 12/2002 | Qi |
| 2002/0191791 A1* | 12/2002 | Anand .................. H04L 9/0643 380/255 |
| 2003/0172252 A1 | 9/2003 | Henry et al. |
| 2003/0185391 A1 | 10/2003 | Qi et al. |
| 2005/0044134 A1 | 2/2005 | Krueger et al. |
| 2005/0089160 A1 | 4/2005 | Crispin et al. |
| 2006/0056620 A1* | 3/2006 | Shingal .................. H04L 9/065 380/28 |
| 2009/0310775 A1 | 12/2009 | Gueron et al. |
| 2010/0214301 A1 | 8/2010 | Li et al. |
| 2010/0250965 A1 | 9/2010 | Olson et al. |
| 2010/0250966 A1* | 9/2010 | Olson .................. G06F 9/30018 713/190 |
| 2011/0276790 A1 | 11/2011 | Olson et al. |
| 2012/0257742 A1 | 10/2012 | Ebeid et al. |
| 2012/0328097 A1 | 12/2012 | Sheikh et al. |
| 2013/0010955 A1 | 1/2013 | Lu et al. |
| 2013/0132737 A1* | 5/2013 | Horsnell ............. G06F 9/30029 713/190 |
| 2013/0283064 A1 | 10/2013 | Yap et al. |
| 2014/0019693 A1 | 1/2014 | Gulley et al. |
| 2014/0019694 A1* | 1/2014 | Gulley ...................... G06F 5/06 711/154 |
| 2014/0189368 A1 | 7/2014 | Wolrich et al. |
| 2014/0195782 A1 | 7/2014 | Yap et al. |
| 2014/0362098 A1 | 12/2014 | Kerofsky |
| 2015/0043729 A1* | 2/2015 | Gopal .................. H04L 9/0625 380/29 |
| 2015/0067302 A1 | 3/2015 | Gueron |
| 2015/0082002 A1* | 3/2015 | Parra .................. G06F 13/16 711/216 |
| 2015/0086019 A1* | 3/2015 | Tamminen ............ H04L 9/0819 380/278 |
| 2015/0178086 A1* | 6/2015 | Hughes ................. G06F 9/3806 711/125 |
| 2015/0186138 A1 | 7/2015 | Wolrich et al. |
| 2015/0186139 A1 | 7/2015 | Wolrich et al. |
| 2016/0070931 A1 | 3/2016 | Gueron et al. |

FOREIGN PATENT DOCUMENTS

| | | |
|---|---|---|
| CN | 103490895 A | 1/2014 |
| EP | 0354774 A2 | 2/1990 |
| GB | 1494750 A | 12/1977 |
| GB | 2496934 A | 8/2012 |
| JP | 2004-109420 A | 4/2004 |
| JP | 2012-252281 A | 12/2012 |
| TW | 200945198 A1 | 11/2009 |
| TW | 201332329 A | 8/2013 |
| WO | 03/050784 A1 | 6/2003 |
| WO | 2003/090074 A2 | 10/2003 |
| WO | 2006/098015 A1 | 9/2006 |
| WO | 2013/095503 A1 | 6/2013 |
| WO | 2013/147877 A1 | 10/2013 |
| WO | 2017/030600 A1 | 2/2017 |

OTHER PUBLICATIONS

Jim Guilford et al. "Fast SHA512 Implementations on Intel Architecture Processors" Nov. 2012 (12 pages).*
Sean Gully et al. "Multi-Hash: A Family of Cryptgrpahic Hash Algorithm Extensions" Jul. 2012 (16 pages).*
Vinodh Gopal et al. "Processing Multiple Buffers in Parallel to Increase Performance on Intel Architecture Processors" Jul. 2010 (24 pages).*
Shay Gueron et al. "Parallelizing message schedules to accelerate the computations of hash functions" Journal of Cryptographic Engineering, vol. 2, Issue #4, Jun. 5, 2012 (20 pages).*
Yuan Ma et al. "Hardware Peformance Optimization and Evaluation of SM3 Hash Algorithm on FPGA" Proceedings of the 14th International Conference on Information and Communications Security, Oct. 2012 (pp. 105-118).*
Junko Najajima et al. "Performance Analysis and Parallel Implementation of Dedicated Hash Functions" EUROCRYPT '02 Proceedings of the International Conference on the Theory and Applications of Cryptographic Techniques: Advances in Cryptology (pp. 165-180).*
Dan A. Alcantara et al. "Real-Time Parallel Hashing on the GPU" ACM Transactions on Graphics, Dec. 2009 (12 pages).*
Search Report from foreign counterpart United Kingdom Patent Application No. GB1503156.0, dated Aug. 21, 2015, 4 pages.
First Office Action from counterpart Japanese Patent Application No. 2015-028528 dated May 24, 2016, 11 pages.
Notice of Preliminary Rejection for Korean Application No. 10-2015-0028373, dated Jul. 18, 2016, 5 pages.
Office Action from counterpart Japanese Patent Application No. 2015-028528, dated Oct. 4, 2016, 2 pages.
Office Action from foreign counterpart Taiwan Patent Application No. 104105374, dated May 26, 2016, 18 pages.
Shen S., et al., "SM3 Hash function," Internet Engineering Task Force, Internet-Draft, draft-shen-sm3-hash-00, pp. 1-16.
Notice of Allowance received for Korean Patent Application No. 10-2015-0028373, dated Jan. 24, 2017, 2 pages of Korean Office Action.
Notice of Allowance received for Taiwanese Patent Application No. 104105374, dated Nov. 28, 2016, 2 pages of Taiwanese Notice of Allowance Only.
Office Action received for United Kingdom Patent Application No. 1503156.0, dated Jun. 3, 2016, 1 page of Office Action.
Ma et al., "Hardware Performance Optimization and Evaluation of SM3 Hash Algorithm on FPGA", © Springer-Verlag Berlin Heidelberg, 2012, pp. 105-118.

(56) References Cited

OTHER PUBLICATIONS

Notice of Allowance received for Taiwan Patent Application No. 104127017, dated May 27, 2016, 4 pages (1 page of English Translation and 3 pages of Taiwanese Notice of Allowance).
Notice of Allowance received for U.S. Appl. No. 13/731,004, dated Sep. 2, 2014, 12 pages.
Final Office Action received for U.S. Appl. No. 14/142,745, dated Sep. 15, 2016, 16 pages.
Non-Final Office Action received for U.S. Appl. No. 14/142,745, dated Jun. 14, 2017, 17 pages.
Non-Final Office Action received for U.S. Appl. No. 14/142,745, dated Mar. 23, 2016, 16 pages.
Non Final Office Action received for U.S. Appl. No. 14/498,931, dated Apr. 8, 2016, 14 pages.
Notice of Allowance received for U.S. Appl. No. 14/498,931, dated Jan. 13, 2017, 7 pages.
Non-Final Office Action received for U.S. Appl. No. 14/568,101, dated Feb. 8, 2017, 14 pages.
Notice of Allowance received for U.S. Appl. No. 14/568,101, dated May 22, 2017, 12 pages.
Non-Final Office Action received for U.S. Appl. No. 14/880,166, dated Apr. 12, 2017, 11 pages.

Extended European Search report received for European Patent Application No. 14194120.3, dated Jul. 10, 2015, 7 Pages.
Office Action received for European Patent Application No. 14194120.3, dated Apr. 4, 2017, 5 pages.
Deepakumara et al., "FPGA Implementation of MD5 Hash Algorithm", Canadian Conference on Electrical and Computer Engineering, vol. 2, 2001, 7 pages.
FIPS PUB 180-1, "Secure Hash Standard", Computer Security, Apr. 17, 1995, 17 pages.
Järvinen et al., "Hardware Implementation Analysis of the MD5 Hash Algorithm", Proceedings of the 38th Hawaii International Conference on System Sciences, 2005, pp. 1-10.
International Search Report and Written Opinion received for PCT Patent Application No. PCT/US2015/065134, dated Jul. 11, 2016, 19 pages.
Wang et al., "Preimage and Pseudo-Collision Attacks on Step-Reduced SM3 Hash Function", Jun. 24, 2013, 13 pages.
Non-Final Office Action received for U.S. Appl. No. 15/600,200, dated Jul. 3, 2017, 14 pages.
Office Action received for Chinese Patent Application No. 201510096246.8, dated Jul. 31, 2017, 10 pages of Chinese Office Action including 5 pages of English Translation.

\* cited by examiner

METHOD AND APPARATUS FOR EFFICIENTLY EXECUTING HASH OPERATIONS

BACKGROUND

Field of the Invention

This invention relates generally to the field of computer processors. More particularly, the invention relates to a method and apparatus for efficiently executing hash operations.

Description of the Related Art

The Secure Message (SM)-3 hash function is a new cryptographic function published by the Chinese Commercial Cryptography Administration for the convenience of the Internet Engineering Task Force (IETF) and Internet Research Task Force (IRTF) communities. SM3 is currently specified as the hashing algorithm for the TCM (Trusted Computing Module) by the China Information Security Standardization Technical Committee (TC260 for short) initiative. The design of SM3 builds upon the design of Secure Hash Algorithm (SHA)-2 by adding additional features to strengthen the has function such as feeding two message-derived words into each round, as opposed to only one in the case of SHA-2.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
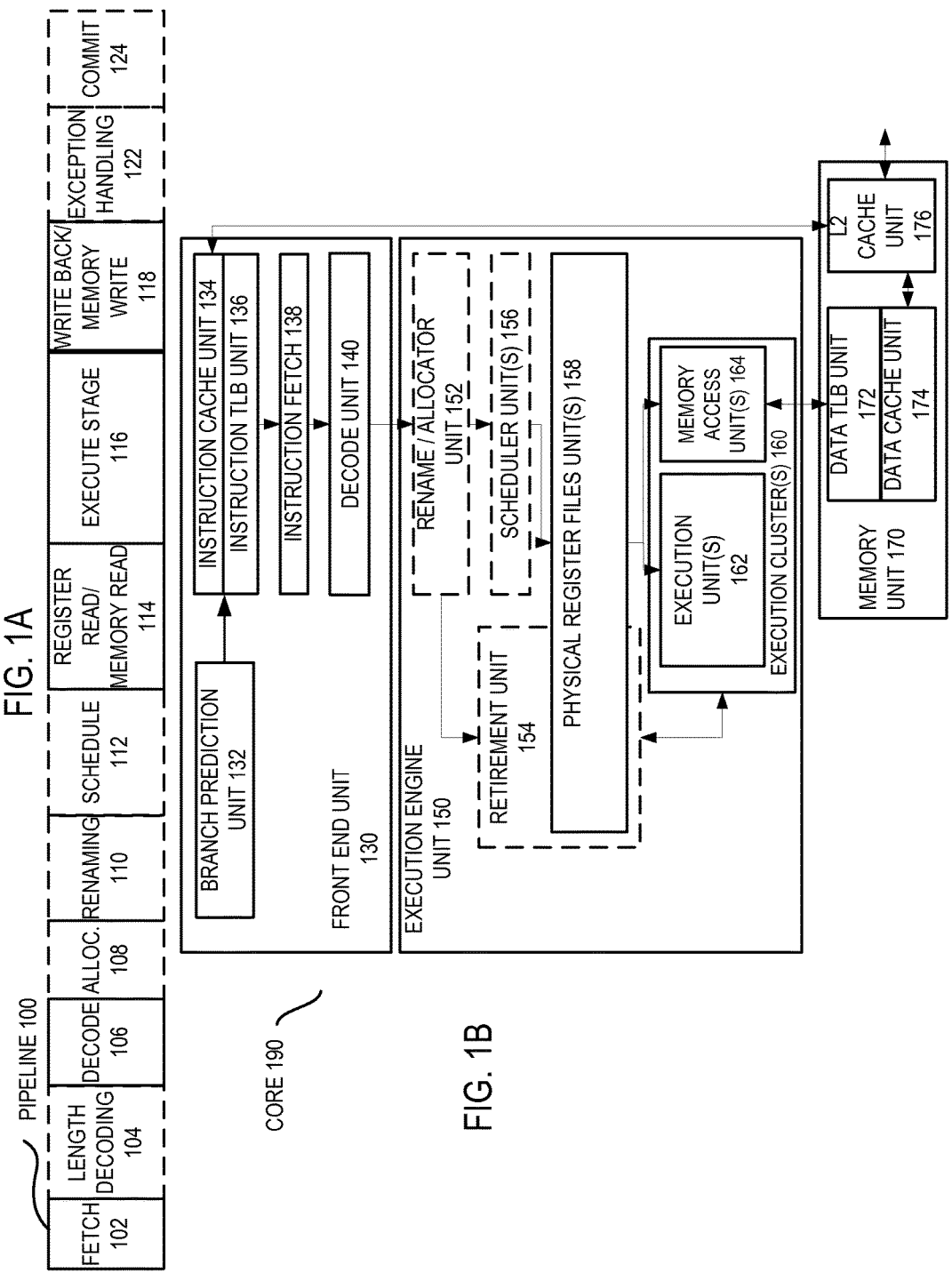
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
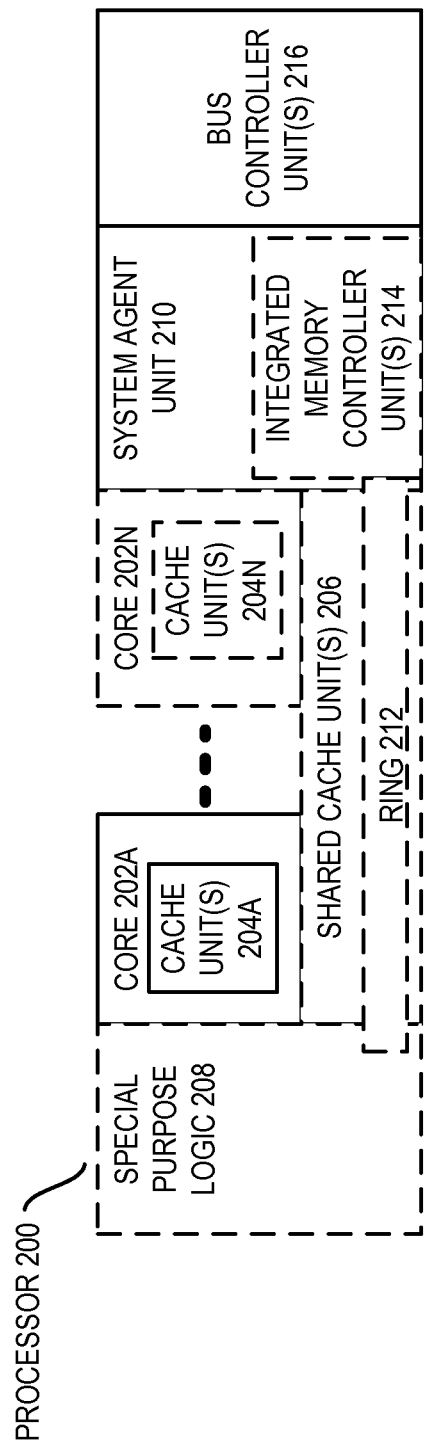
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
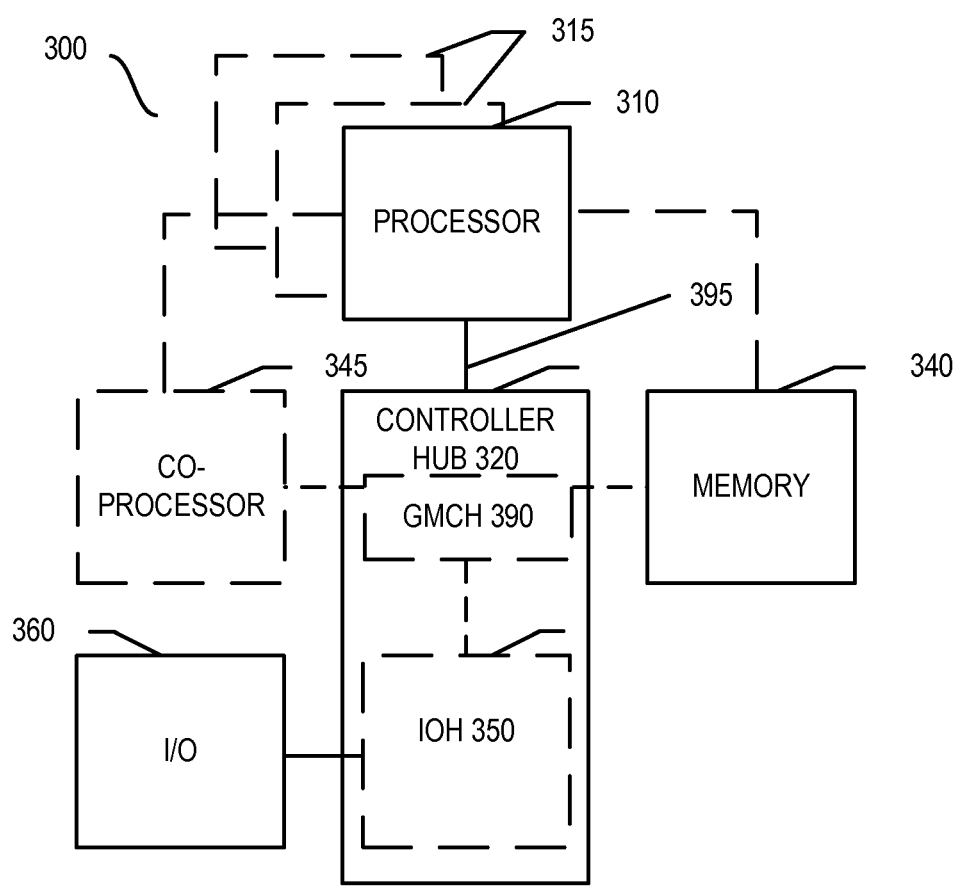
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
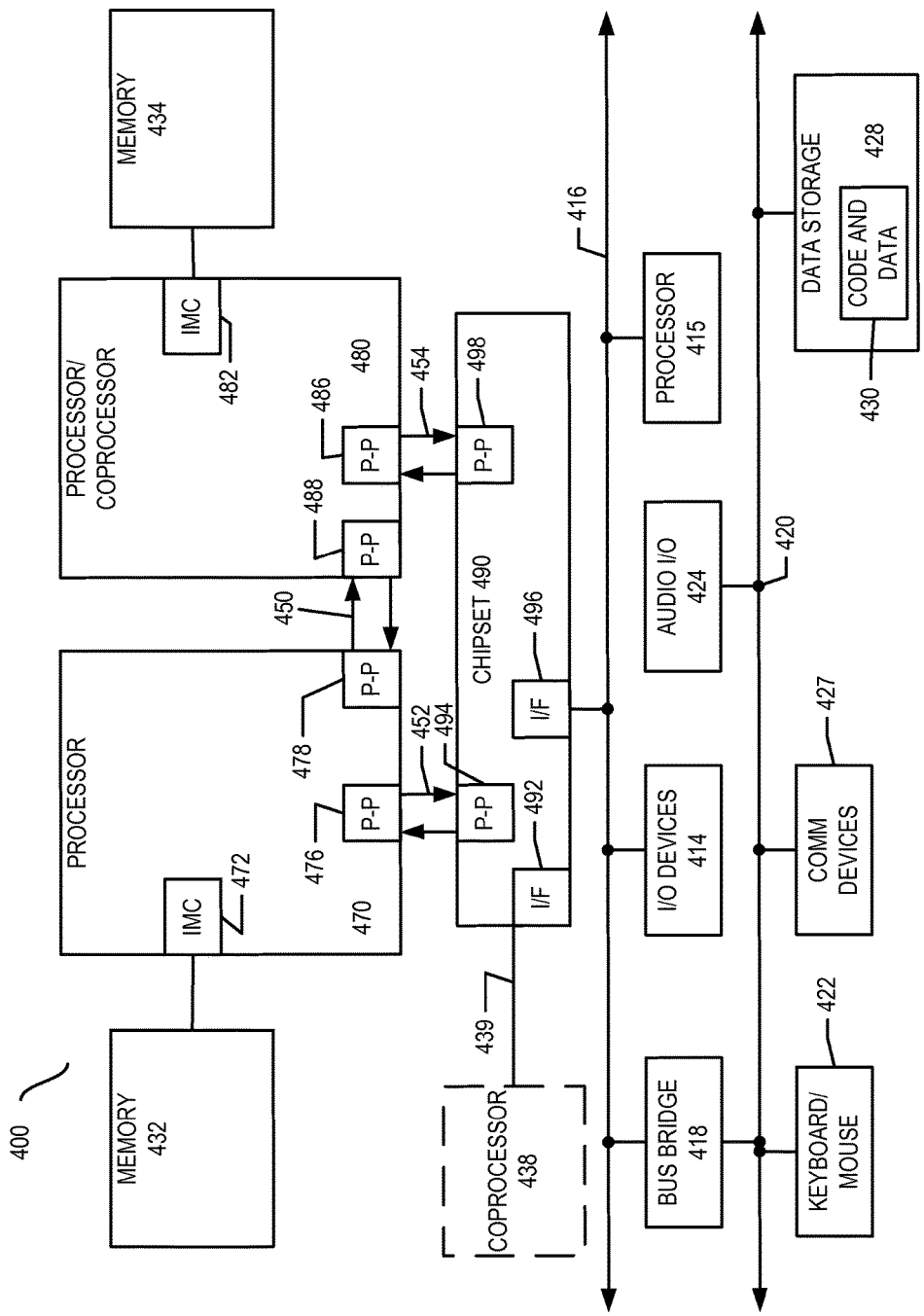
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
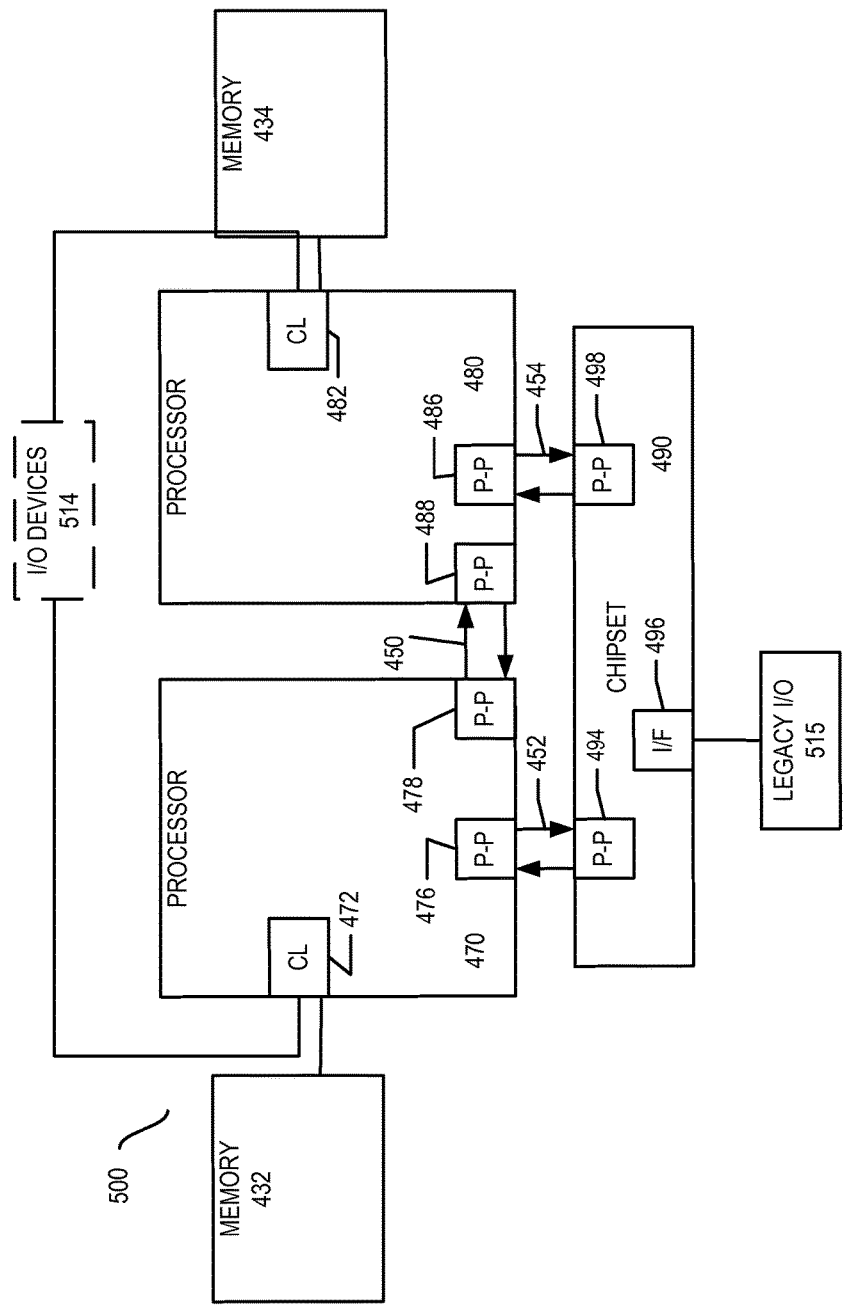
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
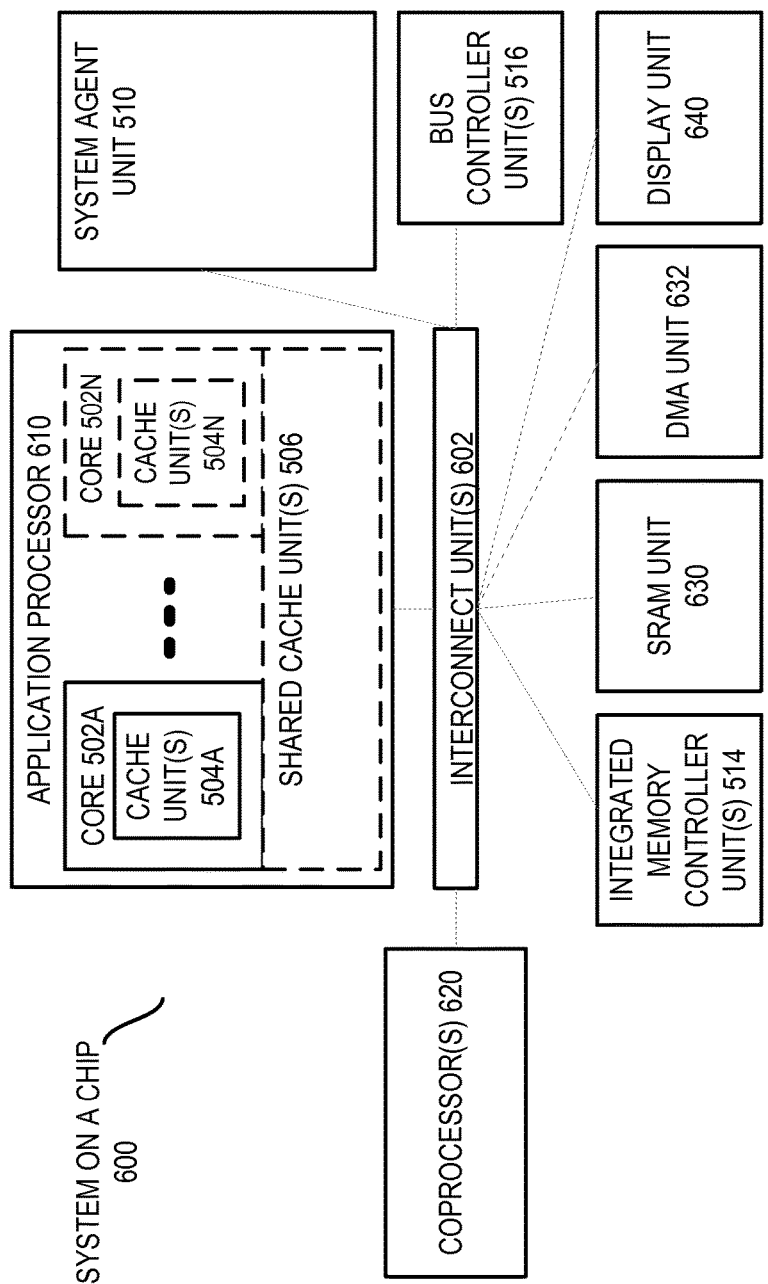
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
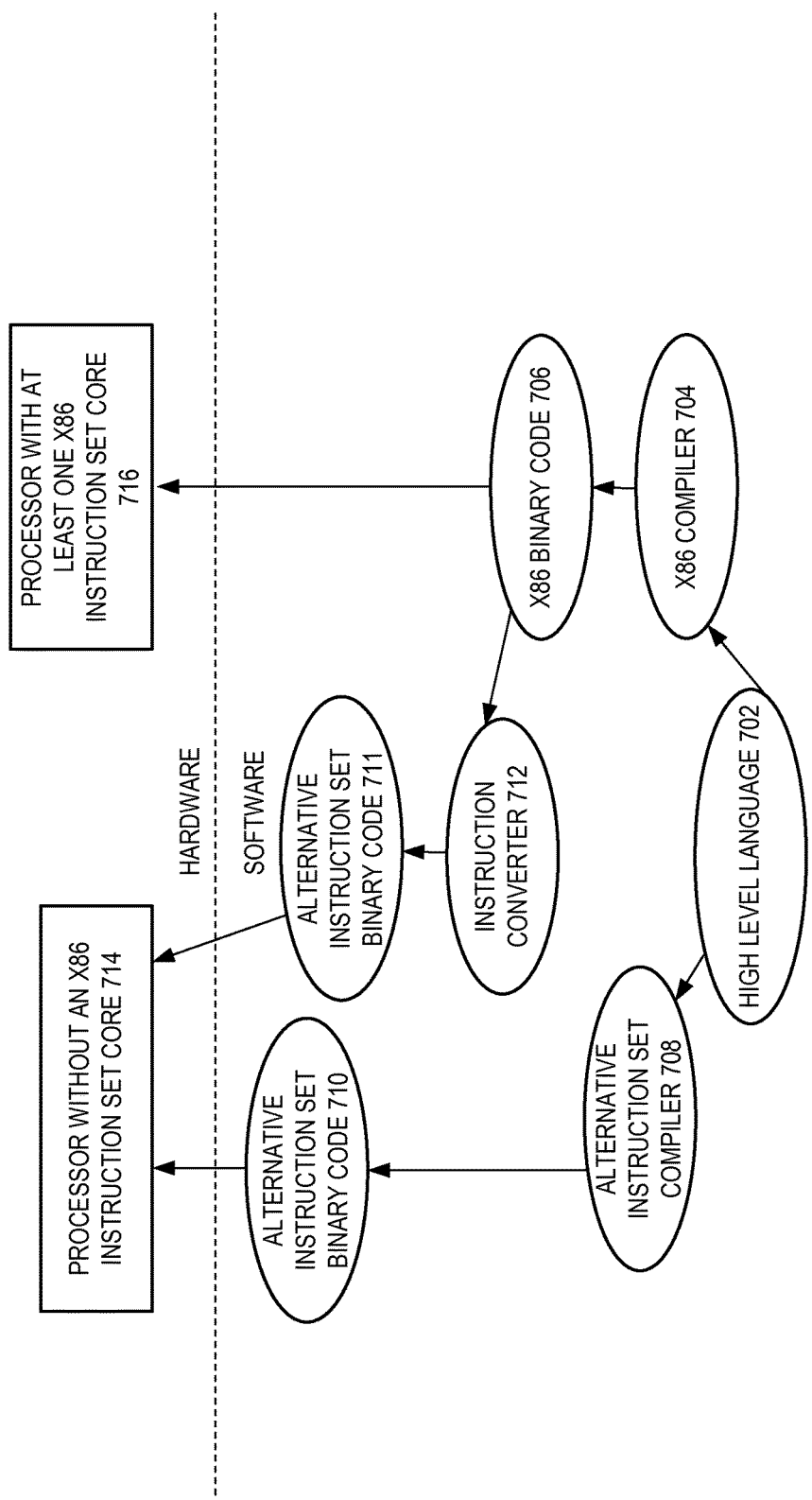
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Efficiently Executing Hash Operations

One embodiment of the invention includes a new instruction and supporting hardware for efficiently performing a hashing operation. While the focus of the embodiments described below is the SM3 hashing algorithm, the underlying principles of the invention are not limited to the specific implementation provided for SM3. For example, the same techniques described below for implementing SM3 may be used to efficiently execute other hashing algorithms and/or other types of processing functions. Moreover, while one embodiment is implemented as an extension to the Intel Architecture (IA), the underlying principles of the invention are not limited to any particular ISA.

Figure 8:
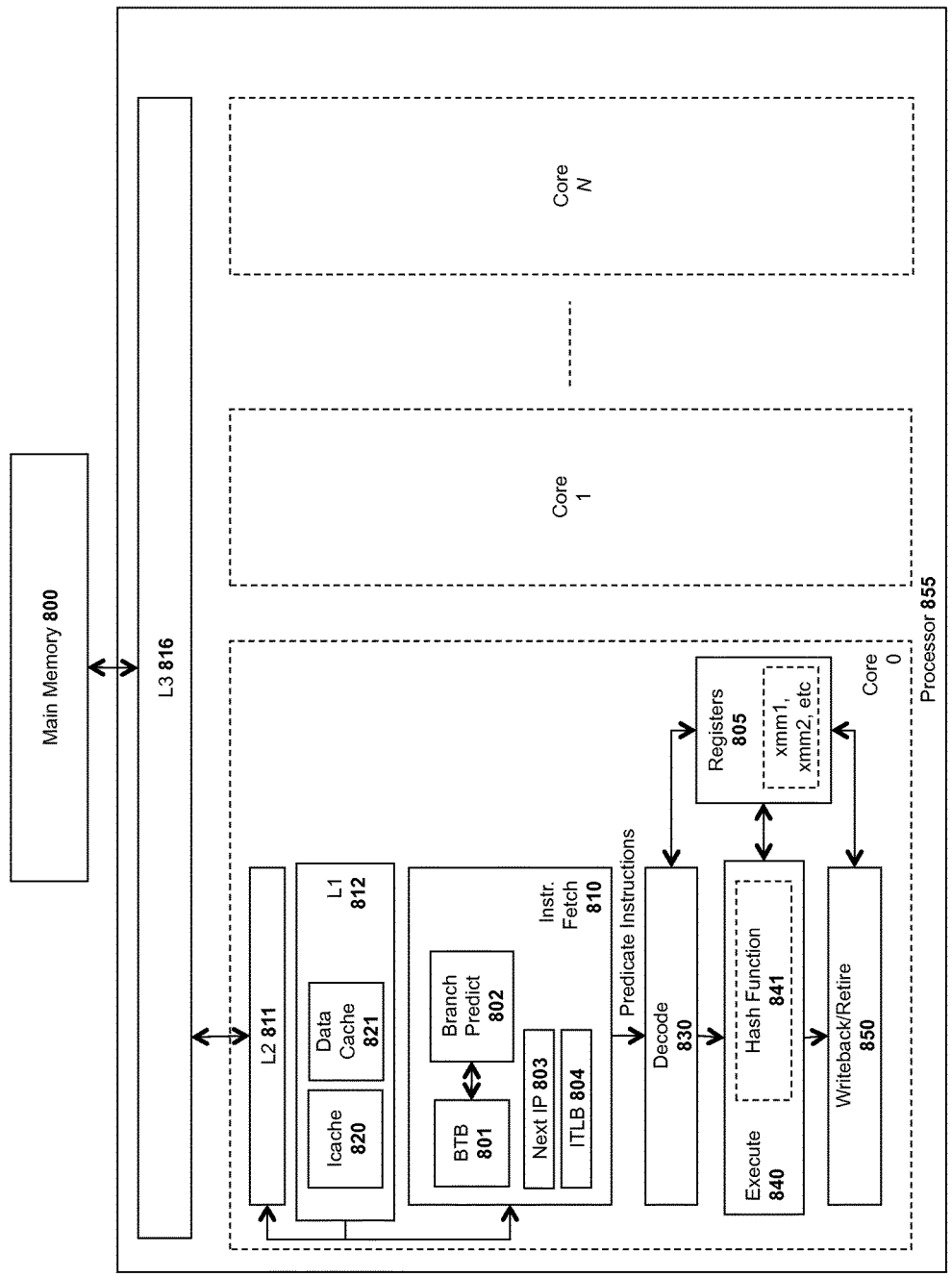
FIG. 8 illustrates one embodiment of a processor architecture on which embodiments of the invention may be implemented.

As illustrated in FIG. 8, an exemplary processor 855 on which embodiments of the invention may be implemented includes an execution unit 840 with hash function execution logic 841 to execute the efficient hashing techniques described herein. A register set 805 provides register storage for operands, control data and other types of data as the execution unit 840 executes the instruction stream. In one embodiment, the register set 805 includes 128-bit registers such as the XMM single instruction multiple data (SIMD) registers specified as part of the IA streaming SIMD extensions (SSE) architecture. Alternatively, or in addition, the registers may include 256-bit registers such as the YMM SIMD registers specified as part of the IA advanced vector extensions (AVX)-2 architecture. However, the underlying principles of the invention are not limited to a particular register type or register size.

The details of a single processor core ("Core 0") are illustrated in FIG. 8 for simplicity. It will be understood, however, that each core shown in FIG. 8 may have the same set of logic as Core 0. As illustrated, each core may also include a dedicated Level 1 (L1) cache 812 and Level 2 (L2) cache 811 for caching instructions and data according to a specified cache management policy. The L1 cache 811 includes a separate instruction cache 120 for storing instructions and a separate data cache 121 for storing data. The instructions and data stored within the various processor caches are managed at the granularity of cache lines which may be a fixed size (e.g., 64, 128, 512 Bytes in length). Each core of this exemplary embodiment has an instruction fetch unit 810 for fetching instructions from main memory 800 and/or a shared Level 3 (L3) cache 816; a decode unit 820 for decoding the instructions (e.g., decoding program instructions into micro-operatons or "uops"); an execution unit 840 for executing the instructions (e.g., the predicate instructions as described herein); and a writeback unit 850 for retiring the instructions and writing back the results.

The instruction fetch unit 810 includes various well known components including a next instruction pointer 803 for storing the address of the next instruction to be fetched from memory 800 (or one of the caches); an instruction translation look-aside buffer (ITLB) 804 for storing a map of recently used virtual-to-physical instruction addresses to improve the speed of address translation; a branch prediction unit 802 for speculatively predicting instruction branch addresses; and branch target buffers (BTBs) 801 for storing branch addresses and target addresses. Once fetched, instructions are then streamed to the remaining stages of the instruction pipeline including the decode unit 830, the execution unit 840, and the writeback unit 850. The structure and function of each of these units is well understood by those of ordinary skill in the art and will not be described here in detail to avoid obscuring the pertinent aspects of the different embodiments of the invention.

As mentioned above, in one embodiment, the hash function logic 841 within the execution unit 840 performs various techniques to process the SM3 hashing algorithm more efficiently. Consequently, a brief description of the basic principles of the SM3 hashing algorithm will first be provided, followed by a detailed description of the embodiments of the invention.

Figure 9:
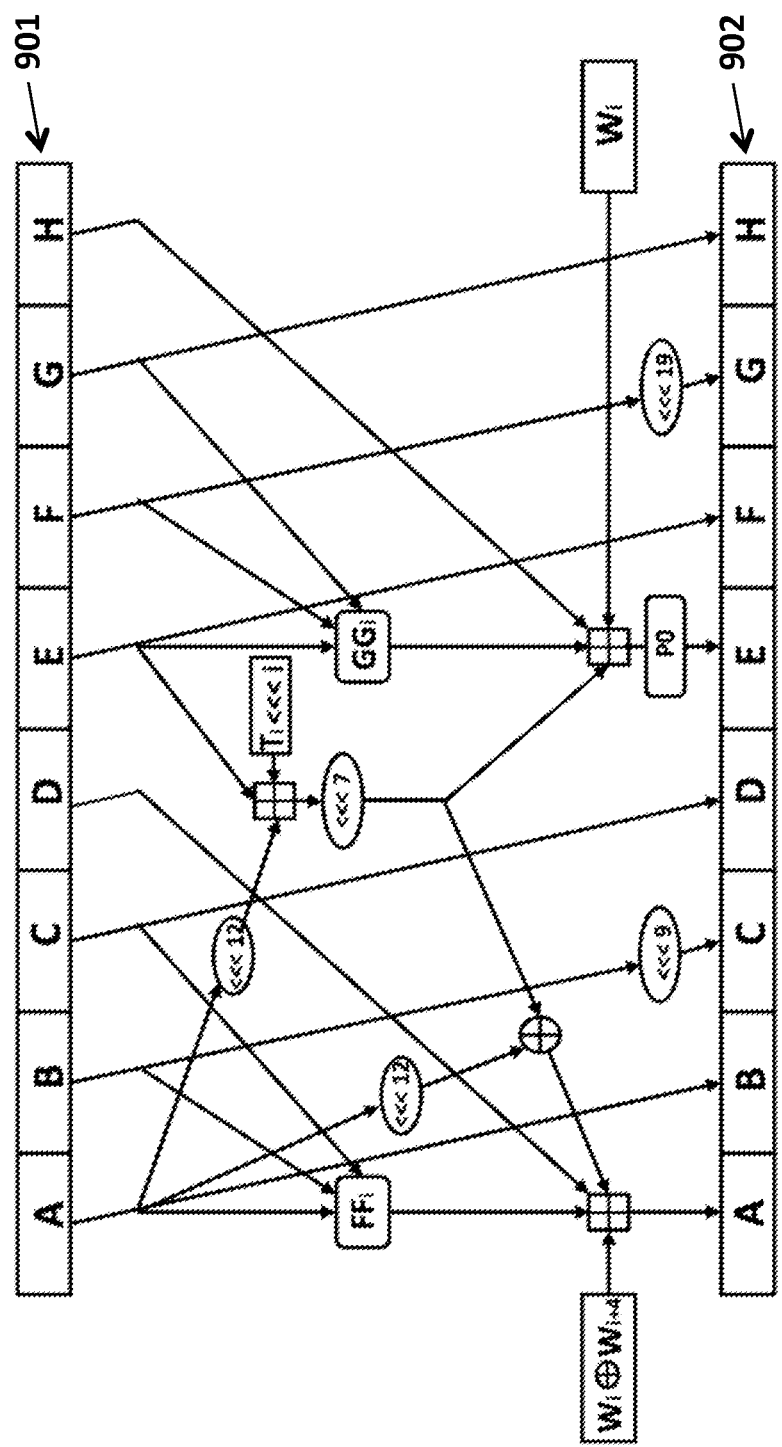
FIG. 9 illustrates operations performed in a round to implement the secure message (SM)-3 hash function.

As used herein, the "message" refers to the binary code on which the SM3 hash is being performed. The "message digest" or "digest" is the final result of the hashing operation. The SM3 algorithm specifies a "stuffing" method to segment messages into full 512-bit blocks. The SM3 compression algorithm is performed on the sequence of 512-bit blocks with the output state of the intermediate blocks serving as the input state for the next 512-bit block compression. The state of each block compression and the final digest is a 256-bit value. The 256-bit state value is partitioned into eight 32 bit "words" referred to as words A, B, C, D, E, F, G and H, and are specified in "Big Endian" format (A then B . . . etc). FIG. 9 graphically illustrates the operations performed during processing round in which a first set of state values 901 is converted to a second set of state values 902. The initial state value is a constant defined in the SM3 standard. In particular, the compression function for the 512-bit blocks is defined as follows:

$$ABCDEFGH \leftarrow V^i$$

$$\text{FOR } j = 0 \text{ TO } 63$$

$$SS1 \leftarrow ((A<<<12) + E + (T_j<<<j)) <<< 7$$

$$SS2 \leftarrow SS1 \oplus (A<<<12)$$

$$TT1 \leftarrow FF_j(A, B, C) + D + SS2 + W'_j$$

$$TT2 \leftarrow GG_j(E, F, G) + H + SS1 + W_j$$

$$D \leftarrow C$$

$$C \leftarrow B<<<9$$

$$B \leftarrow A$$

$$A \leftarrow TT1$$

$$H \leftarrow G$$

$$G \leftarrow F<<<19$$

$$F \leftarrow E$$

$$E \leftarrow P_0(TT2)$$

$$\text{ENDFOR}$$

$$V^{(i+1)} \leftarrow ABCDEFGH \oplus V^i$$

Where:

$$FF_j(X, Y, Z) = \begin{cases} X \oplus Y \oplus Z & 0 \le j \le 15 \\ (X \wedge Y) \vee (X \wedge Z) \vee (Y \wedge Z) & 16 \le j \le 63 \end{cases}$$

$$GG_j(X, Y, Z) = \begin{cases} X \oplus Y \oplus Z & 0 \le j \le 15 \\ (X \wedge Y) \vee (\neg X \wedge Z) & 16 \le j \le 63 \end{cases}$$

The variables SS1, SS2, TT1, and TT2 are internal intermediate values used for each iteration. $T_j$ is specified as 79cc4519 for $0 \le j \le 15$ and 7a879d8a for $16 \le j \le 63$. The $(T_j<<<j)$ input for each round can be predetermined and loaded from a Table referenced by the round value j. The $P_0$ function is a linear translation permutation function specified as $P_0(X)=X$ xor $(X<<<9)$ xor $(X<<<17)$.

The 512 bit block being compressed is partitioned into sixteen 32 bit words referenced in big endian form as W0 to W15. The W' input is specified as $W_j'=W_j$ xor $W_{j+4}$, thus W' to W'11 can be determined with a single xor function from the initial block data.

The Wj input for rounds 16 to 63 and $W_j'$ input for rounds 12 to 63 are developed according to the "Message Expansion" (message scheduler) specified as:

$$W_j = P1(W_{j-16} \text{ xor } W_{j-9} \text{ xor } (W_{j-3}<<<15)) \text{ xor } (W_{j-13}<<<7) \text{ xor } W_{j-6}$$

where P1 is another permutation function specified as:

$$P_1(X)=X \text{ xor } (X<<<15) \text{ xor } (X<<<23).$$

Additionally $W_j$ for j=64 to j=67 are calculated to support the $W_{j+4}$ term in the development of $W_j'$ for rounds 60 to 63.

One embodiment of the invention includes new instructions to increase the performance of the SM3 hashing algorithm on a processor with a 128-bit register file such as the XMM single instruction multiple data (SIMD) registers specified as part of the IA streaming SIMD extensions (SSE) architecture, or with a 256-bit register file such as the YMM SIMD registers specified as part of the IA advanced vector extensions (AVX)-2 architecture. The instruction specified for the 128-bit SSE architecture requires the use of an implicit operand register but has the advantage of enabling SM3 acceleration in a wider range of power-efficient high performance cores using the same XXM based instruction.

One embodiment of the invention takes advantage of the fact that while SM3 state contains 8 state variables A through H, variables B, D, F, and H are updated by simply re-using variables A, C, E, and G, respectively, of the previous round and therefore require no computation. In particular, as discussed above, for the current round:

B (current round)←A (previous round),
D (current round)←C (previous round),
F (current round)←E (previous round), and
H (current round)←G (previous round)

As such, one embodiment of the invention only calculates the state variables A, C, E, G for each round as:
variable A being updated by TT1 and
variable E being updated by $P_0(TT2)$
variable C being updated by last round variable B<<<9, and
variable G being updated by last round variable F<<<19.

The remaining state values, B, D, F, and H, are determined by simply changing the register designations on each processing round, as described below.

Figure 10:
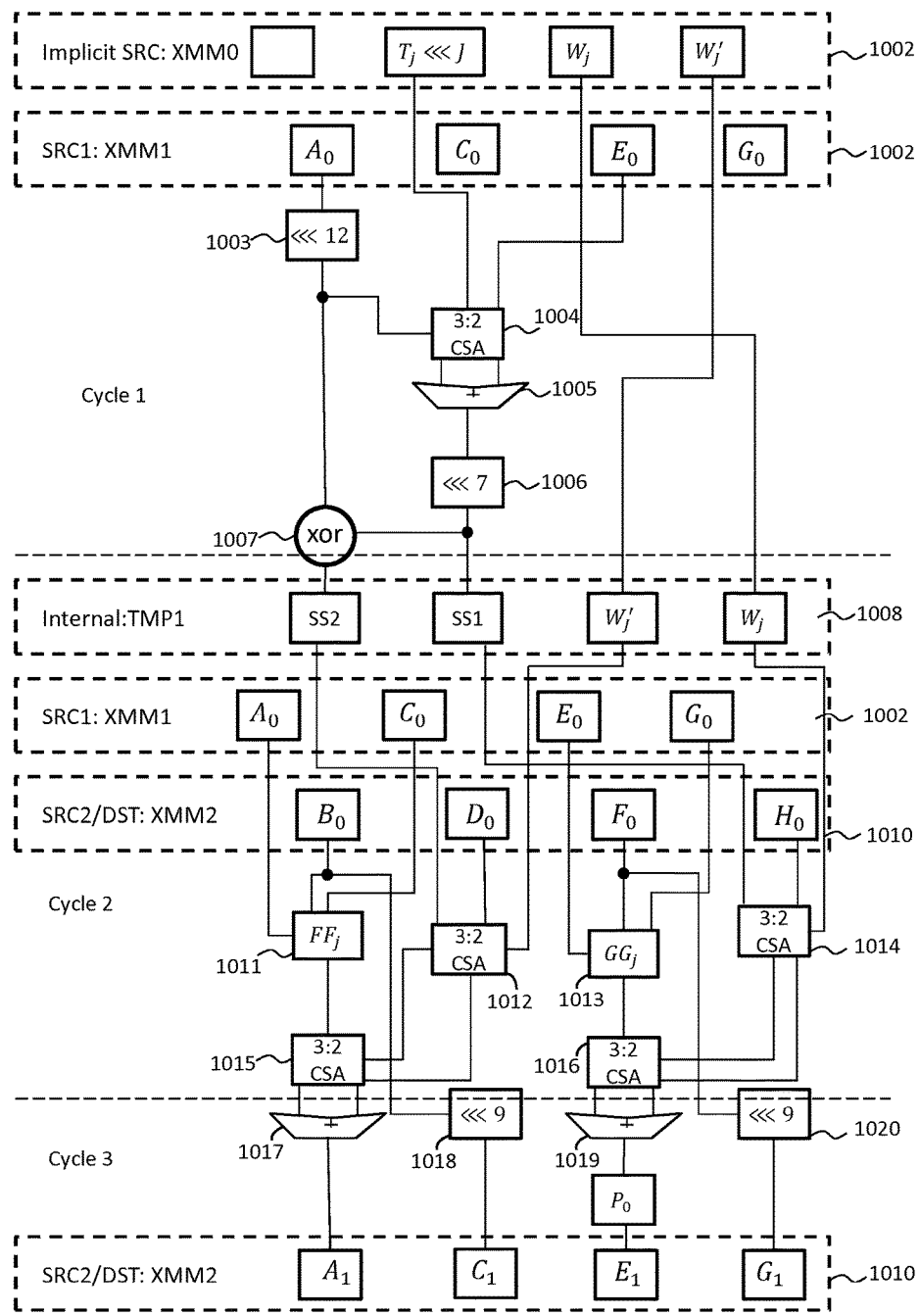
FIG. 10 illustrates one embodiment of an architecture and associated techniques for performing different rounds of a hash operation.

In particular, the total SM3 state of 256 bits requires two 128-bit XMM registers (e.g., xmm1 and xmm2), but the question that remains is how to ideally partition the eight variables A-H. Using the above observations, one embodiment of the invention uses the following efficient register partitioning. As illustrated in FIG. 10, the SM3 state variables are held in two XMM registers, XMM1 1002 and XMM2 1010, with XMM1 1002 containing A, C, E, and G for odd rounds and B, D, F, and H for even rounds, and XMM2 1010 containing B, D, F, H for odd rounds and A, C, E, G for even rounds. FIG. 10 illustrates the details for Round 0 (as indicated by the $A_0$-$G_0$ designations) which utilizes Cycles 1-3 to arrive at values $A_1$, $C_1$, $E_1$, and $G_1$ stored in XMM2 1010 for Round 1.

Note that FIG. 10 illustrates the logic involved for computing values in each cycle but does not specifically identify pipelining techniques or other implementation details which may be employed within a pipelined processor architecture. These details are well understood by those of skill in the art and are not illustrated in FIG. 10 to avoid obscuring the underlying principles of the invention.

For a 128 bit data path and register file, one embodiment of an instruction for updating a single round of SM3 Hash is specified as:

SM3RND XMMsrcdst, XMMsrc, IMM where XMMsrcdst is XMM1 1002 for odd rounds and XMM2 1010 for even rounds and XMMsrc is XMM1 1002 for even rounds and XMM2 1010 for odd rounds. In one embodiment, the immediate vale, IMM, is set to 0 for j=0 to 15 and set to 1 for j=16 to 63.

Turning to the specific details shown in FIG. 10, in one embodiment, XMM0 1001 is an implicit source containing $(Tj<<<j)$, $W_j$ and $W_j'$ for Cycle 1 of Round 0. These values along with $A_0$, $C_0$, $E_0$, and $G_0$ from XMM1 1002 are used to compute values for Cycle 2. An internal temporary storage 1008 (e.g., a non-architectural register or buffer) stores the new values for SS2, SS1, $W_j'$ and $W_j$, as illustrated. SS1 is calculated as follows. The value A rotated left 12 times using operator 1003; a carry save adder 1004 in combination with adder 1005 combines the A<<<12 result with E and $T_j$<<<j; the combined result is then rotated left 7 times using operator 1006. SS2 is calculated by XORing A<<<12 with SS1 using XOR operator 1007. The values for $W_j'$ and $W_j$ are passed through from XMM0 1001, as illustrated.

Cycle 2 starts with the above values, initial values for $A_0$, $C_0$, $E_0$, and $G_0$ stored in XMM1 1002, and initial values for $B_0$, $D_0$, $F_0$, and $H_0$ stored in XMM2 1010. New values for A, C, E, and G (identified as $A_1$, $C_1$, $E_1$, and $G_1$ to connote Round 1) are calculated in Cycles 2-3 and stored in XMM2 1010 as follows. Operator 1011 generates $FF_j$ (A, B, C) using $A_0$, $B_0$, and $C_0$ as inputs (see equation for $FF_j$ above) and operator 1013 generates $GG_j$ (E, F, G) using $E_0$, $F_0$, and $G_0$ as inputs (see equation for $GG_j$ above). The value for $A_1$ is then computed using $FF_j(A_0, B_0, C_0)+D_0+SS2+W_j'$ using carry save adders 1012 and 1015, and adder 1017. The value of $C_1$ is calculated using the value of $B_0$ rotated left 9 via operator 1018. The value of $E_1$ is calculated by multiplying $P_0$ by $GG_j(E_0, F_0, G_0)+H_0+SS1+W_j$, which is calculated with carry save adders 1014 and 1016, and adder 1019. The $P_0$ function is a linear translation permutation function specified as $P_0(X)=(X<<<9)$ xor $(X<<<17)$. Thus, $E_1$ is calculated by performing the $P_0$ Linear translation permutation on $GG_j(E_0, F_0, G_0)+H_0+SS1+W_1$. The value of $G_1$ is calculated by operator 1020 rotating $F_0$ left by 9.

Significantly, only the values for $A_1$, $C_1$, $E_1$, and $G_1$ are calculated in Cycles 2-3. The values for $B_1$, $D_1$, $F_1$, and $H_1$ take on the prior values of $A_0$, $C_0$, $E_0$, and $G_0$. As mentioned above, as XMMsrcdst is XMM1 1002 for odd rounds and XMM2 1010 for even rounds and XMMsrc is XMM1 1002 for even rounds and XMM2 1010 for odd rounds. Thus, the values of A, C, E, and G from one round are not calculated independently or physically moved to new registers when these values become B, D, F, and H in the next round. Rather, these values simply become B, D, F, and H by virtue of the swapping of the XMM1/XMM2 register designations, thereby preserving processing resources.

In an alternate embodiment (e.g., using AVX2 or other architecture with 256-bit registers), an instruction using 256 bit YMM registers that performs the complete state update for a round of SM3 in a single YMM SIMD register can be specified as SM3RND YMM1, YMM2 where YMM1 is a source/destination register for the 8×32 bit SM3 state and YMM2 is a source register containing (Tj<<<j), $W_j$ and $W_j'$ for the present round.

A second higher performance alternative definition can perform two complete rounds of the SM3 hash in a five-cycle SIMD pipe and is specified as:
SM3RNDS2 YMM1, YMM2, YMM3
where YMM1 is a source/destination register with SM3 state for round j as a source and the resulting SM3 state for round j+2 is written back as the destination. In this embodiment, YMM2 is a source register for $W_j$, $W_j'$, $W_{j+1}$ and $W_{j+1}'$, and YMM3 is a source register for $T_j$ and $T_{j+1}$. Note that in one embodiment, this is specified with just two registers with YMM2 holding all of $W_j'$, $W_{j+1}$ and $W_{j+1}'$ $T_j$ and $T_{j+1}$.

For both the single and double SM3 round instruction alternatives, the development of the Wj for rounds 16 to 63 and $W_{j+1}'$ rounds 12 to 63 may be calculated ahead of the round instructions that use the parameters as inputs, and in parallel with the round instructions of earlier rounds so that SM3 performance is not affected by message expansion.

Figure 11:
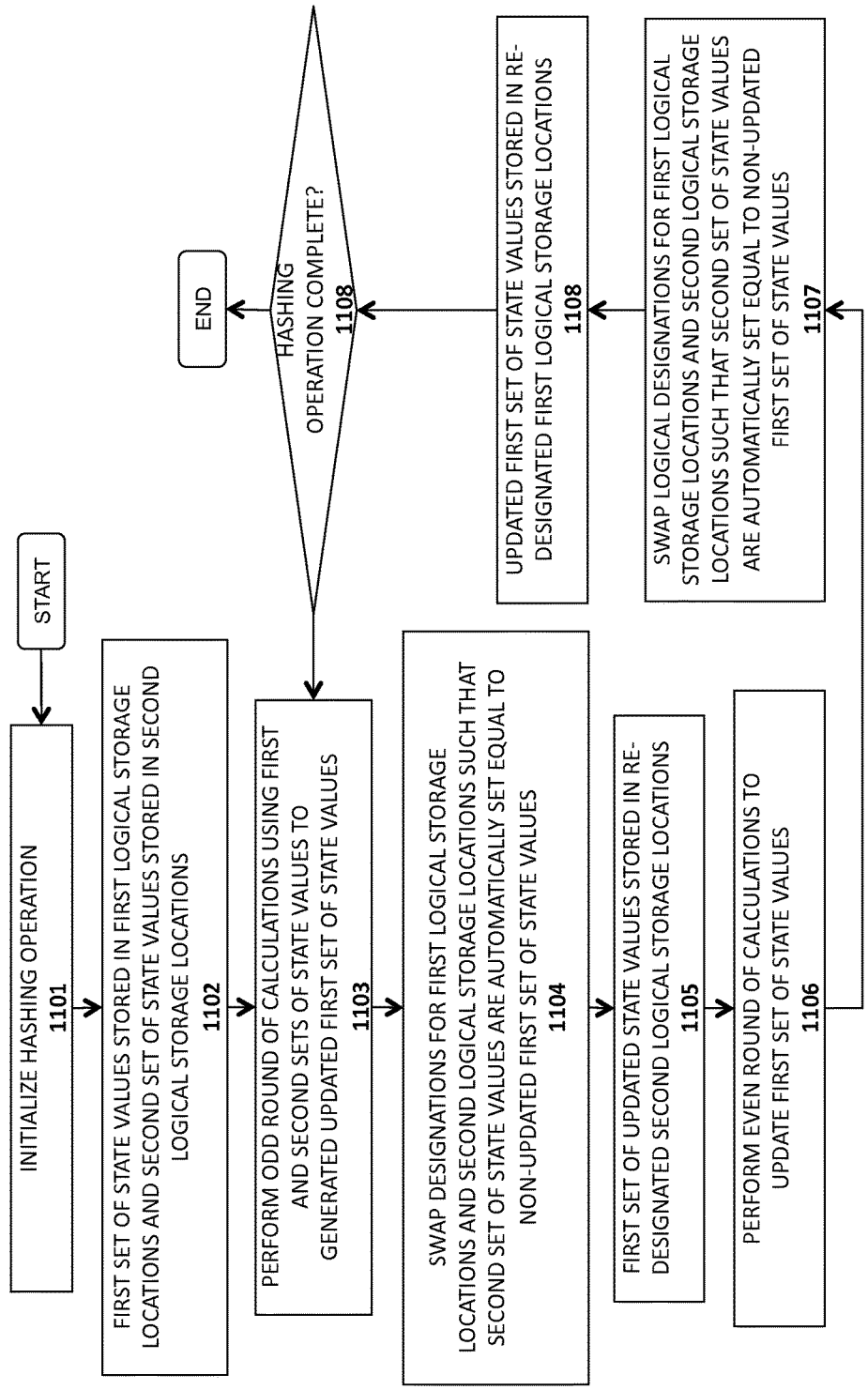
FIG. 11 illustrates a method for performing rounds of a hash function in accordance with one embodiment of the invention.

FIG. 11 illustrates a method in accordance with one embodiment of the invention. At 1101 a hashing operation such as SM3 is initialized within the processor. For example, one of the SM3 instructions described herein may be decoded and the resulting uops provided to one or more execution ports of the execution unit. In addition, the initial values needed to perform the hashing operations are set in the appropriate storage locations. For example, as described above, XMM0 may be updated to contain (Tj<<<j), $W_j$ and $W_j'$ for the first round of processing. Similarly, the temporary storage 1008 shown in FIG. 10 may be updated with the values for SS2, SS1, $W_j'$, and $W_j$.

At 1102, the first set of state values (e.g., $A_0$, $C_0$, $E_0$, and $G_0$) are stored in a first set of logical storage locations (e.g., XMM1) and the second set of state values (e.g., $B_0$, $D_0$, $F_0$, and $H_0$) are stored in a second set of logical storage locations (e.g., XMM2). At 1103, an "odd" round of processing is performed using the first and second sets of state values to generate an updated first set of state values (e.g., new values $A_1$, $C_1$, $E_1$, and $G_1$ are calculated).

At 1104, the designations for the first logical storage locations and second logical storage locations are swapped such that the second set of state values are automatically set equal to the non-updated set of first state values. For example, in the embodiment shown in FIG. 10, the SM3 state variables are held in two XMM registers, XMM1 1002 and XMM2 1010, with XMM1 1002 containing A, C, E, and G for odd rounds and B, D, F, and H for even rounds, and XMM2 1010 containing B, D, F, and H for odd rounds and A, C, E, and G for even rounds. Thus, the values of B, D, F, and H are automatically set to the prior values of A, C, E, and G, respectively, in each round by simply swapping the register designations (i.e., the indication of which state variables are stored in which registers). Thus, as used herein, swapping the "designations" of the storage locations means changing an indication of the data being stored in the storage locations.

At 1105, the newly calculated values A, C, E, and G are stored in the newly-designated second logical storage locations (e.g., $A_1$, $C_1$, $E_1$, and $G_1$ stored in XMM2 in the example shown in FIG. 10), and, at 1106 an even round of calculations are performed using the first and second sets of state variables to again update the first set of state variables (e.g., A, C, E, and G).

At 1107, the designations for the first logical storage locations and second logical storage locations are again swapped such that the second set of state values are automatically set equal to the non-updated set of first state values. As mentioned, in one embodiment, the designated registers containing A, C, E, and G and B, D, F, and H are swapped for even and odd rounds. Thus, the values of B, D, F, and H are again automatically set to the prior values of A, C, E, and G, respectively, by swapping the register designations. At 1108, the updated first set of state values are stored in the first logical storage locations (e.g., in XMM1 in FIG. 10). The method then iterates through 1103 to 1108 until the hashing operation is complete, determined at 1108.

The optimal SM3 implementations are presently FPGA or ASIC dedicated hardware. The performance of SM3 in software is poor due to the number of dependent operations that are required in the calculation of each SM3 round and message expansion. The addition of the SM3RND instructions described herein enables either two rounds of the SM3 hash compression function to be performed in five processor cycles or a single round of SM3 to be completed in three processor cycles. This is estimated to provide a greater than 4× improvement over the best software implementations.

In other embodiments, an immediate byte is used to specify j (instead of a YMM register containing $T_j$). In these embodiments, YMM2 can contain the W values whereas YMM3 can contain W'. Moreover, YMM2 may be defined in the same way as described above and also include the combined W & W' values (without requiring YMM3).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method for executing an SM3 hash function in a processor, the method comprising:
   decoding, with a decode unit of the processor, an SM3 instruction, of an instruction set of the processor, the SM3 instruction:
      initially designating a first storage location as storing a first set of state values used for computing rounds of the hash function; and
      initially designating a second storage location as storing a second set of state values also used for computing rounds of the hash function; and
   executing a plurality of rounds of the hash function, by executing the SM3 instruction and at least one other instance of the SM3 instruction, with an execution unit of the processor, using the first and second sets of state values, wherein executing includes swapping the designations of the first storage location and second storage location for alternatingly instances of the SM3 instructions so that the first storage location is designated to store the first set of state values for a first set of rounds and the second set of state values for a second set of rounds, and wherein the second storage location is designated to store the second set of state values for the first set of rounds and the first set of state values for the second set of rounds.

2. The method as in claim 1 wherein the first set of rounds comprise even rounds and the second set of rounds comprise odd rounds.

3. The method as in claim 2 wherein executing further comprises:
   calculating a new first set of state values in each round using an existing first set and second set of state values; and
   setting the second set of state values equal to the existing first set of state values.

4. The method as in claim 3 wherein said setting the second set of state values equal to the existing first set of state values is performed by the swapping of the designations of the first storage location and the second storage location.

5. The method as in claim 4 wherein the first storage location and the second storage location each comprise a 128-bit packed register.

6. The method as in claim 4 wherein the first storage location and the second storage location each comprise a 256-bit packed register.

7. The method as in claim 3 wherein the first set of state values comprise variables A, C, E, and G of the SM3 hash function and the second set of state values comprise variables B, D, F, and H of the SM3 hash function.

8. The method as in claim 1 wherein each value of the first and second sets of state data comprises a 32-bit value.

9. The method as in claim 8 wherein the first set of state data comprises four 32-bit values and the second set of state data comprises another four 32-bit values.

10. A processor comprising:
   a register set including a first storage location and a second storage location in which state variables to perform an SM3 hash function are to be stored;
   a decode unit to decode an SM3 instruction, of an instruction set of the processor, the SM3 instruction to initially designate the first storage location for a first set of state values to be used to compute rounds of the SM3 hash function, and to initially designate a second storage location for a second set of state values also to be used to compute the rounds of the SM3 hash function; and an execution unit to execute a plurality of rounds of the SM3 hash function by executing the SM3 instruction and at least one other instance of the SM3 instruction using the first and second sets of state values, wherein to execute includes to swap the designations of the first storage location and second storage location for alternating instances of the SM3 instructions such that the first storage location is to be designated to store the first set of state values for a first set of rounds and the second set of state values for a second set of rounds, and wherein the second storage location is to be designated to store the second set of state values for the first set of rounds and the first set of state values for the second set of rounds.

11. The processor as in claim 10 wherein the first set of rounds comprise even rounds and the second set of rounds comprise odd rounds.

12. The processor as in claim 11 wherein the execution unit is further to:
calculate a new first set of state values in each round using an existing first set and second set of state values; and
set the second set of state values equal to the existing first set of state values.

13. The processor as in claim 12 wherein the execution unit is to set the second set of state values equal to the existing first set of state values by the swap of the designations of the first storage location and the second storage location.

14. The processor as in claim 13 wherein the first storage location and the second storage location each comprise a 128-bit packed register.

15. The processor as in claim 13 wherein the first storage location and the second storage location each comprise a 256-bit packed register.

16. The processor as in claim 12 wherein the first set of state values comprise variables A, C, E, and G of the SM3 hash function and the second set of state values comprise variables B, D, F, and H of the SM3 hash function.

17. The processor as in claim 10 wherein each value of the first and second sets of state values comprises a 32-bit value.

18. The processor as in claim 17 wherein the first set of state values comprises four 32-bit values and the second set of state values comprises another four 32-bit values.

19. A system comprising:
a memory to store instructions and data;
a cache subsystem having a plurality of cache levels to cache the instructions and data;
a network interface to communicatively couple the system over a network;
at least one input/output unit to receive commands from one or more peripheral devices; and
a processor comprising:
a register set including a first storage location and a second storage location in which state variables to perform an SM3 hash function are to be stored;
a decode unit to decode an SM3 instruction, of an instruction set of the processor, the SM3 instruction to initially designate the first storage location for a first set of state values to be used to compute rounds of the hash function, and to initially designate a second storage location for a second set of state values also to be used to compute the rounds of the SM3 hash function; and
an execution unit to execute a plurality of rounds of the SM3 hash function by executing the SM3 instruction and at least one other instance of the SM3 instruction using the first and second sets of state values, wherein to execute includes to swap the designations of the first storage location and second storage location for alternating instances of the SM3 instructions such that the first storage location is to be designated to store the first set of state values for a first set of rounds and the second set of state values for a second set of rounds, and wherein the second storage location is to be designated to store the second set of state values for the first set of rounds and the first set of state values for the second set of rounds.

20. The system as in claim 19 wherein the first set of rounds comprise even rounds and the second set of rounds comprise odd rounds.

21. The system as in claim 20 wherein the execution unit is further to:
calculate a new first set of state values in each round using an existing first set and second set of state values; and
set the second set of state values equal to the existing first set of state values.

22. The system as in claim 21 wherein the execution unit is to set the second set of state values equal to the existing first set of state values by the swap of the designations of the first storage location and the second storage location.

23. The system as in claim 22 wherein the first storage location and the second storage location each comprise a 128-bit packed register.

24. The system as in claim 22 wherein the first storage location and the second storage location each comprise a 256-bit packed register.

25. The system as in claim 21 wherein the first set of state values comprise variables A, C, E, and G of the SM3 hash function and the second set of state values comprise variables B, D, F, and H of the SM3 hash function.

* * * * *